United States Patent [19]

Röhm

[11] 4,270,763
[45] Jun. 2, 1981

[54] SPLIT-JAW LATHE CHUCK WITH LOCKABLE INNER JAW PARTS

[76] Inventor: Günter H. Röhm, Hinrich-Röhm-Strasse 50, 7927 Sontheim, Fed. Rep. of Germany

[21] Appl. No.: 40,272

[22] Filed: May 18, 1979

[30] Foreign Application Priority Data

May 19, 1978 [DE] Fed. Rep. of Germany ....... 2821851

[51] Int. Cl.³ .......................... B23B 5/22; B23B 31/16
[52] U.S. Cl. ...................................... 279/123; 279/110
[58] Field of Search .......................... 279/123, 121, 110

[56] References Cited

U.S. PATENT DOCUMENTS

3,682,491 8/1972 Sakazaki .......................... 279/110 X

FOREIGN PATENT DOCUMENTS

337383 5/1959 Switzerland ............................. 279/110

*Primary Examiner*—William R. Briggs
*Attorney, Agent, or Firm*—Karl F. Ross

[57] ABSTRACT

A lathe chuck has a chuck body rotatable about an axis and formed with a plurality of angularly spaced and radially extending inner guides and with a plurality of angularly spaced and radially extending outer guides. Each of the inner guides in turn has an axially forwardly directed and radially extending blocking surface and an axially forwardly opening recess at the respective blocking surface. Inner jaws parts are radially displaceable in the chuck body in the inner guides and outer jaw parts projecting axially from the chuck body are radially displaceable therein in the outer guides. An operating element engages the inner jaw parts and jointly radially displaces them between radially inner and radially outer positions. Each inner jaw part has a coupling member axially displaceable between a forward coupling position engaging the respective outer jaw part and locking same radially to the inner jaw part and an axially offset decoupling position allowing relative displacement of the respective inner and outer jaw parts. Each blocking surface prevents displacement of the respective coupling member into the decoupling position except when it is aligned with the respective recess which only occurs in the radial outer position of the pair so that the inner and outer jaw parts can only be decoupled when they are in the radial outer position.

10 Claims, 2 Drawing Figures

SPLIT-JAW LATHE CHUCK WITH LOCKABLE INNER JAW PARTS

CROSS-REFERENCE TO RELATED APPLICATIONS

This application is related to my copending application Ser. No. 886,348 filed 14 Mar. 1978 (now U.S. Pat. No. 4,200,300) and my jointly filed application Ser. No. 040,126.

FIELD OF THE INVENTION

The present invention relates to a lathe chuck. More particularly this invention concerns a split-jaw lathe chuck having independently adjustable jaws.

BACKGROUND OF THE INVENTION

My first above-cited copending application describes a split-jaw lathe chuck having a chuck body rotatable about an axis and formed with a plurality of angularly spaced and radially extending inner guides and with a plurality of angularly spaced and radially extending outer guides. An inner jaw part wholly received within the chuck body is radially displaceable in each of the inner guides and an outer jaw part projecting axially from the chuck body is radially displaceable in each of the outer guides. An operating element is engaged with all of the inner jaw parts to jointly radially displace them. A coupling member is axially displaceable in each of the inner jaw parts between a coupling position in which the respective inner jaw part is locked for joint radial movement with the respective outer part and an axially offset decoupling position allowing relative radial displacement of the outer jaw parts and the respective inner jaw parts. These coupling members may be independently operable or jointly operable by means of a cam ring.

Such a split-jaw lathe chuck has proven extremely useful. The inner jaw parts can be displaceable only through a relatively limited radial stroke, so that is is possible for the operating member to achieve a considerable mechanical advantage for extremely tight clamping of a workpiece by the jaws. Workpieces of different sizes are accommodated by displacing the outer jaw parts relative to the inner jaw parts so as to position them in such a manner that the limited radial displacement of the inner jaw parts when coupled to the outer jaw parts allows these outer jaw parts to engage and clamp the workpiece, no matter what its size.

A disadvantage of this system is, however, that during setting of the outer jaw parts relative to the inner jaw parts it is possible for the inner jaw parts to move somewhat. It is also possible for the lathe to be started up when one of the outer jaw parts is not properly linked to its respective inner jaw part, so that the workpiece can slip out. What is more it is possible for a machine operator to set all of the outer jaws for a given workpiece size, only to find that the inner jaw parts were in their radial innermost position during such setting so that they will have to be moved to their outermost positions and all of the outer parts reset. It is noted that the operating member for the inner jaw parts is normally connected to some sort of safety arrangement that prevents the chuck from being rotated by the drive motor of the lathe until the jaws are tightly engaged with the workpiece. This can most easily be done by sensing the position of the operating member.

OBJECTS OF THE INVENTION

It is therefore an object of the instant invention to provide an improved split-jaw lathe chuck.

Another object is to provide such a chuck which overcomes the above-given disadvantages.

SUMMARY OF THE INVENTION

These objects are attained according to the instant invention by forming the chuck body at each of the inner guides with an axially forwardly open recess. The coupling member for each jaw is axially receivable in this recess in a predetermined position of the respective inner jaw part. When not in this predetermined position the coupling members each ride on a blocking surface of the respective inner guide so that the inner and outer jaw parts can only be decoupled in the predetermined position of the inner jaw part. When decoupled the inner jaw part will be locked relative to the chuck body.

Thus with the system according to the instant invention during adjustment the inner jaw parts are locked in place so that not only is the machine operator assured that they are in a predetermined position, but accidental actuation of the jaw-tightening cylinder will not displace any of the inner jaw parts if one is in the course of being adjusted. Furthermore according to this invention the predetermined position in which the inner jaw part is locked with respect to the chuck body corresponds to its radial outermost position, so that a worker will only be able to adjust the chuck when the jaws are in the outermost position. This does not mean, of course, that the jaws cannot be internally spanned on a workpiece, but, since a workpiece is normally gripped by the jaws engaging radially inwardly on it, making it possible to separate the split jaws from each other in this radial outermost position ensures that most of the time the adjustment will be carried out when the chuck is in the loosened position. The system according to the instant invention also ensures that the lathe cannot be started up unless each of the inner jaw parts is locked relative to the respective outer jaw part, as when one of the coupling members is engaged in its recess, the position corresponding to the decoupled position between the two jaw parts, the operating member will not be able to move the jaws at all, so that the normally provided safety switch will prevent operation of the lathe drive motor.

According to further features of this invention the means for displacing the coupling members includes respective cam locking elements engaging the coupling members and displaceable between end positions corresponding to the coupling and decoupling positions of the respective coupling members. Respective springs bias these cam locking elements radially outwardly into the end positions corresponding to the coupling positions of the respective coupling members. Each of these coupling members is guided in and jointly displaceable with the inner jaw parts and of generally cylindrical shape.

Each of the locking elements according to this invention has a forwardly directed surface engageable with the respective coupling elements in one of the end positions to prevent backward axial displacement of the respective coupling element, and each of these surfaces is formed with a cutout in which the respective coupling element is engageable in the other end position of the locking element for displacement into the decoupling position if aligned with the respective recess.

Springs urge the inner jaw parts into the decoupling positions. Thus each of the locking members can be constituted as a simple depressable button.

To adjust such a chuck the operator need merely open it up fully, then press each of the locking elements or buttons to slide the outer jaw part into the desired position. Once in these positions the chuck can only be started up when all of the inner and outer jaw parts are positively locked together by the respective coupling members. Centrifugal forces effective during rotation of the lathe chuck will urge the locking elements radially outwardly so as to lock each of the outer jaw parts on the respective inner jaw parts.

SPECIFIC DESCRIPTION

Figure 1:
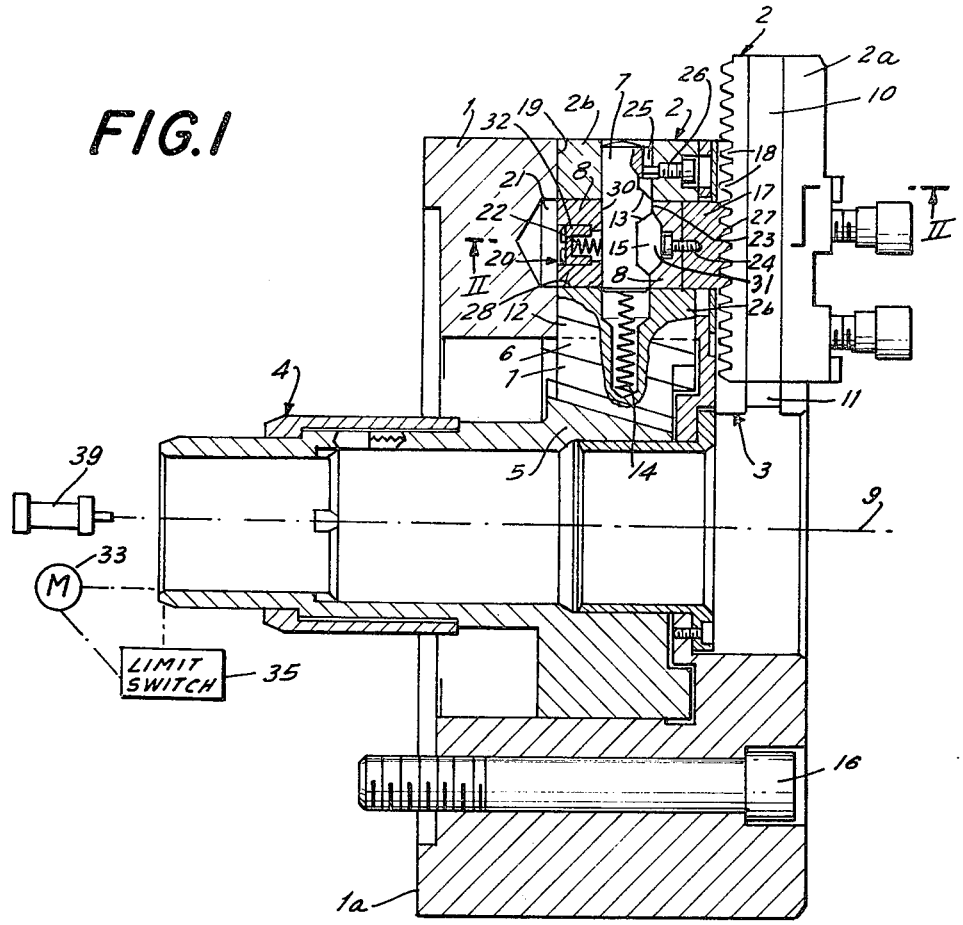
FIG. 1 is an axial section through a lathe chuck according to the instant invention.
Figure 2:
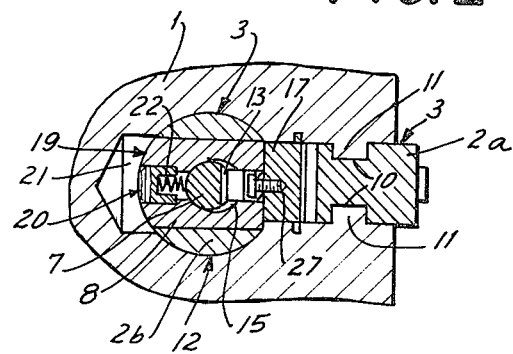
FIG. 2 is a section taken along line II—II of FIG. 1.

The chuck shown in FIGS. 1 and 2 is similar in operation to that described in my earlier filed above-cited application Ser. No. 886,348 and substantially identical to that described in my jointly filed application Ser. No. 040,126. This chuck has a chuck body 1 normally rotated when in use about an axis 9 and provided with three angularly equispaced jaws generally indicated at 2 and each displaceable in a respective guide generally indicated at 3. This chuck is a so-called power chuck whose rear face 1a is normally bolted by means of large Allen screws 16 to the headstock of a lathe. It has an operating member 4 formed in part as a sleeve 5 within the body 1. This sleeve 5 carries wedge-hooks 6 that engage within wedge-hooks 7 on the jaws 2. Displacement of the operating member 4 axially toward the right in FIG. 1 will displace the jaws 2 radially outwardly, and vice versa.

According to this invention each of the jaws 2 is formed of a tool-steel outer or front jaw part 2a and a tool-steel inner or back jaw part 2b, the latter carrying the respective hook 7. The front jaw part 2a as shown in FIG. 2 is formed with a pair of radially extending square-section grooves 10 which receive respective square-section guide ridges 11 of the body 1. Each of the back parts 2b is of cylindrical shape and rides in a corresponding cylindrical and radially extending guide bore 12 of the chuck body 1.

The front jaw part 2a is formed on its axially backwardly facing rear surface with a plurality of teeth 18 forming a rack, each of these teeth 18 extending in a plane parallel to the axis 9 and perpendicular to a plane including the axis 9. A generally cylindrical coupling element 8 has a head 17 secured to it by means of a screw 24. This head 17 is formed with forwardly directed teeth 27 forming a rack interfittable with the rack formed by the teeth 18. The cylindrical coupling element 8 and its head 17 are axially displaceable in the back jaw part 2b in a cylindrical bore 28 formed therein.

A locking element 7 formed basically as a cylindrical bar is received in aligned bores 30 and 29 of the coupling member 16 and back jaw part 2b, the former being axially elongated and the latter being cylindrical. This locking element 7 is biased radially outwardly by a compression spring 14. When in this radially outer position it holds the coupling member 16 in the illustrated position so that the teeth 27 and 19 engage each other and relative radial displacement of the respective jaw parts 2a and 2b is impossible. A screw 26 threaded in the jaw part 2b has a tip engaging in an axially forwardly open recess 25 of the locking element 30 to prevent it from falling axially out of the respective outer jaw part 2b.

The locking element 7 is formed on its axially forwardly directed face with a pair of cutouts 15 lying behind the axial front face 23 of this element 7 and having inclined flanks 13. In addition the coupling member 8 is formed with an axially backwardly directed cutout 31. Thus when the locking element 7 is displaced inwardly so that its surfaces 23 are aligned with the cutout 31, the coupling element 8 and its head 17 can move axially backwardly to disengage the teeth 27 and 18. A spring 22 is braced between the back edge of the locking element 7 and a counterbored screw 32 screwed into the back end of the member 8, and serves to urge the member 8 axially backwardly.

The chuck is shown in FIG. 1 in the open position, that is the position when its operating member 4 is advanced forwardly, to the right in FIG. 1, so that the inner or back jaw parts 2b are radially as far out as they can go. In this position the member 8 is aligned with an axial bore 21 formed in the body 1 at the back of the respective guide bore 12. In this position, therefore, when the button or element 7 is depressed the spring 22 can push the respective coupling member axially backwardly into this bore 21, thereby disengaging the teeth 18 and 27 and allowing the outer or front jaw part to move radially relative to the inner or back jaw part 2b. When not in this position the rear face 20 of the member 8 rides on a blocking surface 19 of the guide 3 and therefore locks together the respective jaw parts 2a and 2b.

Thus the two jaw parts 2a and 2b can be decoupled only when the inner jaw part 2b is in the radial outer position, with the cylindrical coupling member 8 axially aligned with the cylindrical socket recess 21. Furthermore when the member 8 is thus engaged in the recess 21, radial displacement of the part 2b is impossible due to the good fit between these two complementary parts.

The chuck according to this invention is normally rotated about the axis 9 by a motor 33 and the member 5 is displaced axially by a hydraulic cylinder 34 that may be incorporated in the chuck body 1. In addition the lathe incorporating the chuck according to the instant invention has a conventional limit switch 35 that prevents the motor from starting up when the jaws 2 are in their illustrated radial outermost position. This switch 35 normally prevents the lathe from being started up unless a workpiece is firmly gripped in the jaws 2, since a skilled operator will never adjust the chuck, whether internally or externally gripping a workpiece, so that the jaws are in this position during machining.

With the system of this invention the jaws 2 are each locked in this outermost position by interfitting of the member 8 into the respective recess 21 until the teeth 18 and 27 are firmly locked together. Thus it is impossible with the system according to the invention to start up the lathe unless the jaw parts 2a and 2b are properly locked together.

I claim:
1. A lathe chuck comprising:
a chuck body rotatable about an axis and formed with a plurality of angularly spaced and radially extending inner guides and with a plurality of angularly spaced and radially extending outer guides, each of said inner guides in turn having a respective axially forwardly directed and radially extending blocking surface and a respective axially forwardly opening recess at the respective blocking surface;

respective inner jaw parts radially displaceable in said chuck body in said inner guides;

means including at least one operating element engageable with said inner jaw parts for radially displacing same in said chuck body in the respective inner guides between radially inner and radially outer positions;

respective outer jaw parts projecting axially from said chuck body and radially displaceable therein in said outer guides;

respective coupling members between said inner jaw parts and the respective outer jaw parts and each engageable only in a predetermined radial position of the respective inner jaw part in the respective recess, said members when not engaged in the respective recesses riding on the respective blocking surfaces and being in a coupling position engaging both of the respective parts and coupling same together for joint radial displacement and being axially displaceable only when aligned axially with the respective recesses from said coupling position into a decoupling position engaged at least partially in the respective recesses for relative displacement of the respective jaw parts; and means for displacing said members between the coupling and decoupling positions only when said members are aligned with the respective recesses in said predetermined radial positions of the respective inner jaw parts.

2. The lathe chuck defined in claim 1 wherein said predetermined positions of said inner jaw parts correspond to said radially outer positions thereof.

3. The lathe chuck defined in claim 1 wherein said means for displacing said members includes respective cam locking elements engaging said coupling members and displaceable between end positions corresponding to the coupling and decoupling positions of the respective coupling members.

4. The lathe chuck defined in claim 3, further comprising respective springs biasing said locking elements into the end positions corresponding to said coupling positions of the respective coupling members.

5. The lathe chuck defined in claim 1 wherein said coupling members and said recesses are of complementary shape, each of said members being snugly fittable into the respective recess.

6. The lathe chuck defined in claim 1 wherein said coupling members each have a toothed front face and said front jaw parts each have a toothed rear face meshable with the respective toothed front face.

7. The lathe chuck defined in claim 1 wherein said rear jaw parts are each of substantially cylindrical shape.

8. A lathe chuck comprising:

a chuck body rotatable about an axis and formed with a plurality of angularly spaced and radially extending inner guides and with a plurality of angularly spaced and radially extending outer guides, each of said inner guides in turn having a respective axially forwardly directed and radially extending blocking surface and a respective axially forwardly opening recess at the respective blocking surface;

respective inner jaw parts radially displaceable in said chuck body in said inner guides;

means including at least one operating element engageable with said inner jaw parts for radially displacing same in said chuck body in the respective inner guides between radially inner and radially outer positions;

respective outer jaw parts projecting axially from said chuck body and radially displaceable therein in said outer guides;

respective coupling members carried in said inner jaw parts and engageable with the respective outer jaw parts and each engageable in a predetermined radial position of the respective inner jaw part in the respective recess, said members when not engaged in the respective recesses riding on the respective blocking surfaces and being in a coupling position engaging both of the respective parts and coupling same together for joint radial displacement and being axially displaceable only when aligned axially with the respective recesses from said coupling position into a decoupling position engaged at least partially in the respective recesses for relative displacement of the respective jaw parts; and safety means for displacing said members between the coupling and decoupling positions only when said members are aligned with the respective recesses in said predetermined radial positions of the respective inner jaw parts, said safety means including respective cam locking elements carried in said inner jaw parts, engaging the respective coupling members, and displaceable between end positions corresponding to the coupling and decoupling positions of the respective coupling members, said members and elements being jointly radially displaceable with the respective inner jaw parts.

9. The lathe chuck defined in claim 8 wherein each of said locking elements has an axially forwardly directed surface engageable with the respective coupling element in one of said end positions to prevent backward axial displacement thereof, and each of said surfaces is formed with a cutout in which the respective coupling element is engageable in the other end position for displacement into said decoupling position if aligned with the respective recess.

10. The lathe chuck defined in claim 9, further comprising respective springs urging said inner jaw parts into the decoupling positions.

* * * * *